United States Patent [19]

Holcomb et al.

[11] 4,435,370
[45] Mar. 6, 1984

[54] PREPARATION OF MONOCALCIUM PHOSPHATE AND/OR PHOSPHORIC ACID FROM PHOSPHATE ROCK

[75] Inventors: Dysart E. Holcomb, Shreveport, La.; Erhart K. Drechsel, Montgomery, Tex.; John B. Sardisco, Shreveport, La.

[73] Assignee: Pennzoil Company, Houston, Tex.

[21] Appl. No.: 306,856

[22] Filed: Sep. 29, 1981

[51] Int. Cl.³ .................. C01B 25/22; C01B 25/32
[52] U.S. Cl. ................................ 423/158; 423/167; 423/319
[58] Field of Search .............. 423/319, 166, 167, 158, 423/163

[56] References Cited

U.S. PATENT DOCUMENTS

| | | | |
|---|---|---|---|
| 2,954,275 | 9/1960 | Carothers et al. | 23/88 |
| 2,976,141 | 3/1961 | Carothers et al. | 71/40 |
| 3,619,136 | 11/1971 | Case | 23/165 |
| 3,792,151 | 2/1974 | Case | 423/166 |
| 4,026,995 | 5/1977 | Case | 423/321 R |
| 4,086,322 | 4/1978 | Drechsel | 423/158 |
| 4,160,657 | 7/1979 | Drechsel | 423/319 |
| 4,222,990 | 9/1980 | Drechsel | 423/319 |

OTHER PUBLICATIONS

Pozin, M. E., et al.; "Phosphoric Acid Production"; Chem. Absts., vol. 73, 1970, p. 109, No. 5499m.
Drechsel, E. K., "Phosphate Conversion:-A New Perspective"; presentation to Amer. Chem. Soc.; San Francisco, Calif.; Sep. 1, 1976.
"Processes Recover Fluoride from Phosphate"; Technology, C&EN, Sep. 24, 1979; pp. 37-38.

Primary Examiner—Edward J. Meros
Assistant Examiner—Wayne A. Langel
Attorney, Agent, or Firm—Lowe, King, Price & Becker

[57] ABSTRACT

Monocalcium phosphate, phosphoric acid and/or potassium phosphate, calcium fluoride and gypsum are produced in a process involving acidulation of phosphate rock with phosphoric acid, and wherein monocalcium phosphate dissolved in phosphoric acid is formed during acidulation. In important features, insolubles and impurities are removed and a portion of the monocalcium phosphate may be separated and recovered. Alkali metal ion is added to the solution to form alkali metal fluosilicate, such as $K_2SiF_6$, is separated and hydrolyzed with calcium ion to form $CaF_2$ and the solution is recycled as $RH_2PO_4/H_3PO_4$ for further reaction with fluorides, where R is alkali metal. A portion of the $MCP/H_3PO_4$ solution and/or crystallized monocalcium phosphate can then be reacted with potassium sulfate, potassium bisulfate, or mixtures thereof, to form $KH_2PO_4$ or $KH_2PO_4/H_3PO_4$ solutions, and gypsum or with $H_2SO_4$ to produce phosphoric acid. The remaining monocalcium phosphate/phosphoric acid solution can be reacted with sulfuric acid to produce phosphoric acid product and the recycle phosphoric acid required in the phosphate rock acidulation step.

10 Claims, 5 Drawing Figures

PREPARATION OF MONOCALCIUM PHOSPHATE AND/OR PHOSPHORIC ACID FROM PHOSPHATE ROCK

This application is related to U.S. Pat. No. 4,086,322, issued Apr. 25, 1978 and U.S. Pat. No. 4,160,657, issued July 10, 1979.

TECHNICAL FIELD

This invention relates to a method for the production of monocalcium phosphate and/or phosphoric acid and co-products by the acidulation of phosphate rock with phosphoric acid in the presence of silicon dioxide wherein fluoride evolution is suppressed and at least a portion of the calcium may be recovered as monocalcium phosphate.

BACKGROUND ART

Phosphoric acid plants are currently operated utilizing a basic and well-known process for the acidulation of phosphate rock which comprises reaction of the rock with sulfuric acid to form phosphoric acid with subsequent reaction of the phosphoric acid, with for example ammonia to produce monoammonium phosphate (MAP) and diammonium phosphate (DAP). The phosphoric acid formed in this process is called wet process phosphoric acid. In this reaction, a by-product is gypsum having the chemical formula $CaSO_4.2H_2O$. Essentially, all phosphate rock contains some fluoride, normally in the 3.0 to 4.0% range, and the acidulation reaction usually generates gaseous fluorides.

In recent years, both air and water pollution laws and regulations have become more stringent and are now being enforced more rigorously thus requiring that fluoride evolution from such plants be halted. Further, in recent years, studies have been made on the effects of fluorides contained in the final product and indications seem clear that they may have a deleterious effect on the long range producing ability of the soil when present in fertilizers.

In these systems, any conventional wet process phosphoric acid technology accomplishes two primary objectives, namely: (1) phosphate rock acidulation, and (2) the growth of readily filterable calcium sulfate crystals either as the dihydrate (gypsum), or as the hemihydrate. Conventional phosphoric acid technology carries out both of these objectives essentially simultaneously which leads to a number of environmental and purification problems. The presence of excess strong sulfuric acid in the acidulation phase releases fluorides as HF, $SiF_4$ and/or $H_2SiF_6$. This poses serious fluoride emission and subsequent recovery problems. Furthermore, unless excess sulfate levels are carefully and closely controlled, minute gypsum crystals can and will blind rock particles and usually result in poor $P_2O_5$ recovery. The presence of free $H_2SiF_6$ in the acid system leads to severe scaling and excessive maintenance costs even with improved design features to minimize this effect.

There is a great deal of art related to attempts to remove the fluoride values from fluorine-containing phosphate rock in the operation of a phosphoric acid plant including methods for suppressing the evolution of fluoride values in the operation of a process and/or attempting to scrub the fluorine from effluent gases and waste water. Two such methods are described in U.S. Pat. Nos. 2,954,275 and 2,976,141 to Carothers et al which use sodium or potassium compounds to suppress the fluorides so that they are concentrated in the gypsum cake. However, these processes were conducted in the presence of sulfuric acid in the acidulation reactor and the process had incomplete control on fluoride decomposition and evolution during acidulation.

Other prior art patents which have attempted to overcome the problem of fluorine evolution and the reduction of the amount of fluorine contained in final products are British Pat. No. 735,086 (1955), which discloses the acidulation of phosphate rock by a two-step procedure using a strong mineral acid such as nitric acid or hydrochloric acid, and U.S. Pat. No. 3,431,096 to Hill et al, which reduces evolution of fluoride values in formation of triple superphosphate fertilizer by reaction of phosphate rock and phosphoric acid wherein ammonia or urea is added to suppress the fluorine evolution. However, in this patent, there is no provision for removal of the fluorine values from the product and therefore even if the fluorine evolution is prevented, the fluorine values will be retained in the resulting product and distributed to the soil when it is used as a fertilizer.

A series of United States patents issuing from the mid-1940's to early 1960's, disclosed processes for the defluorination of phosphate rock and the production of defluorinated calcium phosphates. In these U.S. Pat. Nos. 2,337,498; 2,442,969; 2,893,834 and 2,997,367, the defluorination reaction is carried out by subjecting a mixture of phosphate rock, phosphoric acid and an alkali metal material to calcination, that is, by reaction at temperatures as high as 1000° C. to 2200° C. Obviously, under these conditions, the fluorine would be evolved rapidly, or if not evolved, certainly will remain in the final product, said to be an animal feed.

Two additional patents of pertinence to processes of this type are U.S. Pat. Nos. 2,567,227 and 2,728,635 to Miller which disclose the acidulation of phosphate rock with phosphoric acid to form monocalcium phosphate, cooling to crystallize the monocalcium phosphate and then converting it to dicalcium phosphate by disproportionation. In the earlier patent, it is indicated that the fluorine in the rock is vaporized in the system, circulates throughout the system and/or leaves the system with the calcium phosphate. The latter patent states that the process of U.S. Pat. No. 2,567,227 provided a final calcium phosphate product having a fluorine content too high to be of animal feed grade. The solution to this problem in the later patent was the addition of some dilute sulfuric acid in the acidulation step which would, of course, lead to additional fluorine evolution during the first step.

Patents are also known in the art which acidulate phosphate rock with phosphoric acid and then recover solid monocalcium phosphate by cooling of the resulting solution and recovering the monocalcium phosphate. Processes of this type are disclosed, for example, in U.S. Pat. Nos. 3,494,735 and 3,645,676. In addition, U.S. Pat. Nos. 3,619,136 and 3,792,151 to Case disclose the reaction of phosphate rock with recycle phosphoric acid at temperatures of about 125°–180° F. (52°–83° C.) to form a solution of monocalcium phosphate, reacting the latter solution with sulfuric acid to produce phosphoric acid and hydrated calcium sulfate, separating the hydrated crystals and recycling a portion of the phosphoric acid to the phosphate rock acidulation. These patents point out that under the conditions cited, fluorides are not evolved but remain primarily unreacted and may be found with insoluble materials although a portion remains in the phosphoric acid solution product. Thus, the products would still be contaminated with fluorides. It is also known to react phosphate rock or a solubilized form with sulfuric acid and KHSO₄ in combination with other steps and this reaction is described in U.S. Pat. Nos. 3,697,246 and 3,718,253.

A further pertinent patent is U.S. Pat. No. 4,026,995, issued May 31, 1977 to Case, which teaches the defluorination of monocalcium phosphate/ phosphoric acid solutions by hydrolyzing the soluble calcium fluosilicates to calcium fluoride, phosphoric acid and silicon dioxide. This patent, however, does not contemplate the presence of alkali metal ion in the system, and in fact, states that the prior art has been unsuccessful in this art when alkali metal fluosilicates of low commercial value are precipitated.

Other patents in the phosphoric acid and fluoride art suggest methods for use of scrubbing and recycling plants in an effort to contain or convert the fluorides evolved so that as much as possible of the fluorine can be recovered. Nevertheless, in all of these earlier approaches to the problem, provisions are never made for eliminating or minimizing the substantive amounts of fluoride contained in the final product nor are there provisions made for converting the fluorides to useful products.

It is also known from an article by Pozin et al, Chemical Abstracts, Vol. 77, no. 141900V, 1972, abstracted from Agrochemie 1972, 12 (6), 164–6, and by Ivanov et al, in Journal of Applied Chemistry of the USSR, Vol. 50, no. 6, pp. 1151–3 (1977), that phosphoric acid can be produced from apatite materials such as phosphate rock by decomposition of the rock with phosphoric acid in the presence of soda to liberate fluoride compounds in the form of $Na_2SiF_6$. The calcium in the solution is then precipitated by adding sulfuric acid to form gypsum.

In the above-identified previously issued U.S. Pat. Nos. 4,086,322 and 4,160,657, there are disclosed processes by which phosphate rock may be acidulated with phosphoric acid in the presence of potassium ion and silicon dioxide. These processes provide effective procedures for the elimination of fluoride evolution. The latest technology concerning this problem is the above mentioned U.S. Pat. No. 4,160,657, which represents a departure from these prior processes and provides for more economic utilization of potassium fluosilicate in the system wherein both phosphoric acid and potassium ion are regenerated and reused as essential reactants. The present invention provides a still further economical and advantageous process for the commercial area.

It is to be appreciated therefore, that the process of the invention provides an improvement over the processes of the references discussed herein and all other references of which applicants are aware. The present invention provides a system which substantially eliminates the fluoride problem in the acidulation of fluorine-containing phosphate rock with phosphoric acid, enables one to use low grade phosphate rock or matrix, and facilitates the recovery of useful products from the acidulation reaction and the recovery of the fluorine contained in the rock in a usable form. Therefore, the present invention provides a unique combination of steps and advantages not appreciated heretofore in the prior art.

DISCLOSURE OF INVENTION

It is accordingly one object of this invention to produce relatively pure phosphoric acid and/or relatively pure monocalcium phosphate which are substantially free of fluorides, iron, aluminum, magnesium and other impurities.

A still further object of this invention is to produce relatively pure potassium phosphates and/or relatively pure phosphoric acid from low grade phosphate rock in such manner as to eliminate or greatly reduce valuable nutrient losses such as $R_2O$, where R is alkali metal, and yet recover the fluorides in usable form.

A still further object of this invention is to provide a multi-step process for the treatment of phosphate rock in such manner as to concentrate insoluble fluoride compounds in recoverable form so that they can be processed for fluorine and $K_2O$ recovery and reuse, and minimize contamination of the environment and final products by the presence of fluorine compounds.

An even further object of the present invention is to provide a process wherein phosphoric acid, fertilizer products comprising $RH_2PO_4$, where R is alkali metal such as potassium or sodium, and gypsum, as well as fluoride-containing products such as calcium fluoride, are produced by a continuous process wherein fluoride evolution is minimized and production of undesired by-products essentially eliminated.

A further object of the invention is to provide a process wherein phosphoric acid, monocalcium phosphate or mixtures thereof, are produced by the acidulation of phosphate rock, and alternatively useful fertilizer products, and valuable fluoride-containing products, and wherein the $R_2O$ in the system is regenerated from the fluoride products for reuse in the elimination of additional fluoride from the phosphoric acid solution.

An even further object of the invention is to provide a process for the production of valuable products from low grade phosphate rock or matrix, which products have impurity levels lower than those provided from high grade rock.

Other objects and advantages of the present invention will become apparent as the description thereof proceeds.

In satisfaction of the foregoing objects and advantages there is provided by this invention a method for the acidulation of phosphate rock and the production of a member selected from the group consisting of phosphoric acid, monocalcium phosphate, and mixtures thereof, which may subsequently be converted to potassium dihydrogen phosphate, a valuable fertilizer, and/or phosphoric acid, as well as the recovery and isolation of the fluoride compounds initially as $R_2SiF_6$, where R is alkali metal, preferably potassium, and ultimately as calcium fluoride admixed with $SiO_2$. This process comprises in its broadest embodiment, the acidulation of phosphate rock with fresh and/or recycled phosphoric acid, the reacting being conducted to produce a solution of monocalcium phosphate in phosphoric acid. In this specification, monocalcium phosphate is sometime abbreviated to MCP. Insolubles are then separated from the resulting slurry to produce a clarified solution of monocalcium phosphate in phosphoric acid which contains fluorides in solution, preferably at about the acidulation temperature.

At this stage of the process, options are available depending on the products desired to be produced. In one main embodiment, the product is phosphoric acid which contains monocalcium phosphate, whereas in a second main embodiment the desired product is monocalcium phosphate or a mixture of monocalcium phosphate and a phosphoric acid. In the first embodiment, an alkali metal salt is simply added to the solution to remove fluosilicates and provide a product solution of monocalcium phosphate and phosphoric acid. In a second aspect of this embodiment, the fluosilicate is removed and then subjected to hydrolysis to form $CaF_2$.

In the second main embodiment, the MCP/$H_3PO_4$ solution is initially subjected to crystallization by lowering the temperature to remove a portion of the monocalcium phosphate. To the remaining solution is added an alkali metal salt to form alkali metal fluosilicate of the formula $R_2SiF_6$, where R is alkali metal, to provide a solution of monocalcium phosphate in phosphoric acid. In the second aspect of this embodiment, sufficient monocalcium phosphate is initially precipitated for a portion to be combined with the subsequent alkali metal fluosilicate to cause hydrolysis and recover the fluorides from the system with recycle of process liquids.

An important aspect of the invention resides in the hydrolysis reactions where the alkali metal fluosilicate solids can be hydrolyzed in the presence of calcium ion. In one aspect, the latter may be provided by the monocalcium phosphate to regenerate the alkali metal ion and phosphoric acid for recycle to the system while recovering the fluorides as alkali metal fluoride in admixture with any fluosilicate present. The alkali metal ion thus may be recycled to the system. If insufficient silicon dioxide is not already present from the phosphate rock, it may be added at various points in the system to provide a sufficient amount to form the fluosilicate.

After removal of the fluosilicate from the system, the resulting phosphoric acid and/or monocalcium phosphate and/or mixture of monocalcium phosphate, and phosphoric acid may be treated by a number of procedures to recover valuable products.

A portion of the solid monocalcium phosphate and/or clarified monocalcium phosphate/phosphoric acid solution after processing to remove fluoride and monocalcium phosphate if desired, may then be reacted with $K_2SO_4$, $KHSO_4$, mixtures thereof, or $H_2SO_4$, to produce potassium dihydrogen phosphate and/or phosphoric acid solutions. The remaining portion of the monocalcium phosphate/phosphoric acid solution may be reacted with sulfuric acid to precipitate calcium sulfate hydrate which is removed from the system, and phosphoric acid, a portion of which may be removed as product, with the balance being recycled to the acidulation reactor as determined by material balance considerations. Monocalcium phosphate is also referred to herein as MCP.

BRIEF DESCRIPTION OF THE DRAWINGS

Reference is now made to the drawing accompanying this application wherein.

BEST MODE FOR CARRYING OUT THE INVENTION

Figure 1:
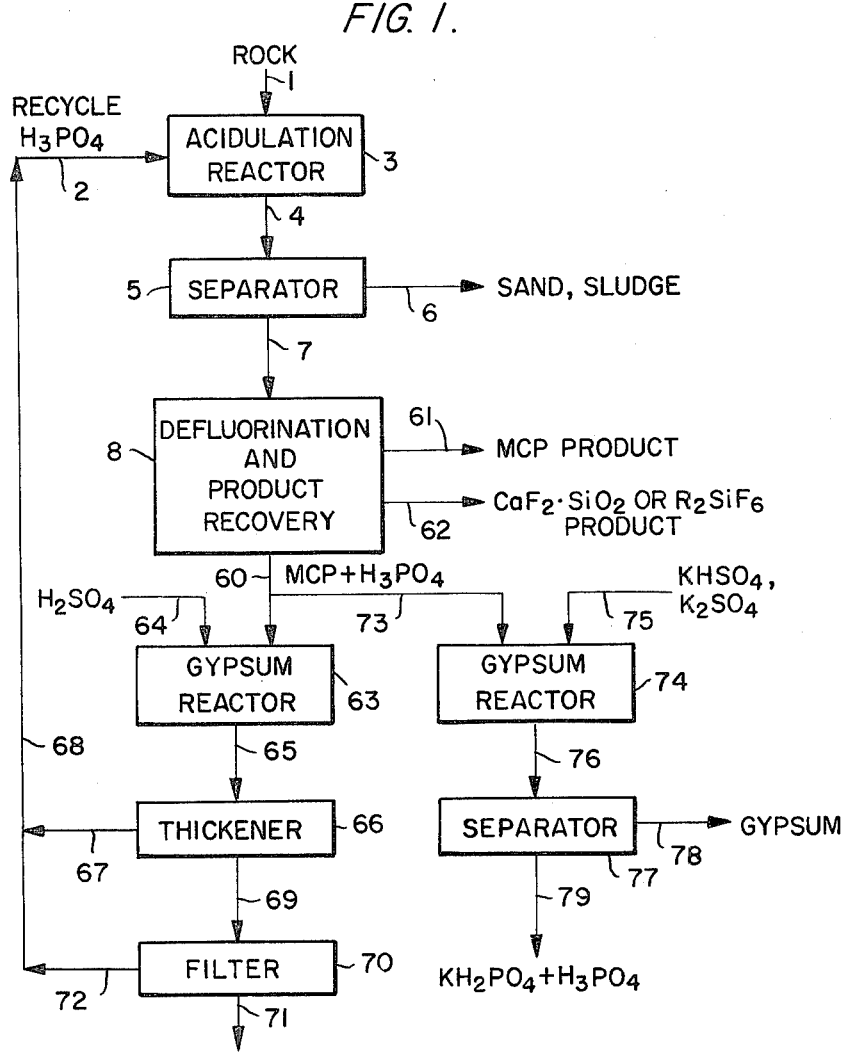
FIG. 1 is a flow sheet showing the broad embodiment of the process of this invention.

As indicated above, this invention is concerned with a multi-step procedure for the preparation of essentially fluoride-free products, preferably monocalcium phosphate and/or phosphoric acid, by the acidulation of phosphate rock, especially low grade phosphate rock, with excess phosphoric acid, which procedure is conducted in the substantial absence of fluorine evolution and pollution and wherein the fluorides may be recovered in usable form as solid calcium fluoride, usually admixed with silica, and wherein phosphoric acid and alkali metal ion may be regenerated for reuse in the system.

As is known, most of the commercially important phosphate ores mined in this country, and particularly those mined in Florida, contain 3-4% fluorine after beneficiation. The fluorine is a constituent of fluoapatite which is commonly expressed as $Ca_9(PO_4)_6 \cdot CaF_2$. Silica is a component of phosphate rock and is usually abundant in most grades of rock that are commonly used in the production of wet process phosphoric acid. In prior art processes, the fluorine compounds in the phosphate rock react with sulfuric acid during the attack on the rock so that the fluorine appears in vapor form as hydrofluoric acid (HF), silicon tetrafluoride ($SiF_4$), or other gas, and in the phosphoric acid solution as fluosilicic acid ($H_2SiF_6$) and/or fluosilicate salts or other forms. Acids from a rock low in reactive silica may also contain free hydrogen fluoride. The present invention provides a significant solution to problems of fluoride pollution by providing a procedure for minimizing fluoride evolution while recovering substantially all of the fluorides in usable form thereby preventing the fluorides from contaminating the environment and desired products. The present invention also provides a series of substantially purer and more useful products, particularly from low grade rock and/or matrices, as well as novel procedures for obtaining these products without pollution.

In above-identified U.S. Pat. No. 4,160,657 a process similar to this invention was presented except that sufficient potassium ion is initially present in the acidulation reactor to convert fluorides present to potassium fluosilicate. The resulting insoluble potassium fluosilicate is then removed from the solution of monocalcium phosphate and phosphoric acid, hydrolyzed to regenerate potassium ion which is recycled to the acidulation reactor and the fluorides are recovered. The monocalcium phosphate is then recovered from the phosphoric acid at a subsequent stage.

It is a feature of the present invention that the process may be carried out using phosphate rock of any grade, but good results are especially achieved using low grade phosphate rock, or so-called phosphate rock matrix. According to the present invention, low grade phosphate rock, or matrix, can be used to produce products which have impurity levels no higher than those obtained from products produced from high grade rock by other processes of the art. In current technology, the production of phosphoric acid from low grade rock, or matrix, results in products having high levels of impurities with excessive sulfuric acid consumption. The present invention overcomes this disadvantage of the art. This low grade phosphate rock contains higher concentrations of sands, clays, and other impurities and, thus, inherently would provide lower conversions with higher concentrations of impurities in the final products. The use of this low grade phosphate rock, while still achieving the outstanding results of the present invention, is unexpected.

In the initial step of the process of this invention, phosphate rock from any origin, but usually of the type described above and preferably phosphate rock matrix, containing at least some fluorides, is acidulated with a solution of phosphoric acid which may contain low alkali metal ion recycle values and optionally, in the presence of silica or silicon dioxide at temperatures of from room temperature up to about 100° C., preferably from about 60° to 100° C., and more preferably at a temperature of about 60° to 80° C., for a sufficient time to achieve a substantially complete acidulation reaction.

The residence time for this acidulation reaction is preferably about ½ to 4 hours. A sufficient amount of the phosphoric acid solution is used to substantially solubilize the calcium phosphate formed, preferably in a countercurrent manner in one or more reactors, as known by those skilled in the art. Some alkali metal ion may be present in the phosphoric acid solution but an insufficient amount is present in the mixture to cause complete precipitation of the fluorides as a solid phase. In conducting this initial step, the phosphoric acid solution is utilized in sufficient excess to effect substantial solubilization of the calcium in phosphate rock. The $P_2O_5$ content of the phosphoric acid should range from about 20-55% and preferably about 25-40% by weight. In general, there should be used an excess of phosphoric acid and preferably about 36 to 90 moles of phosphoric acid for each 6 moles of phosphate in phosphate rock, or a molar ratio of $P_2O_5$ in the acid to $P_2O_5$ in the rock, of about 6:1 to 15:1, respectively.

If needed, silica may be added at various points in the system. The silica may be amorphous silicon dioxide in any suitable form so long as it is not deleterious to the reaction under consideration. The silica is preferably obtained from materials combinable with the phosphate rock, such as slag, or commerically available products such as those sold under the tradename "Dicalite", sold by Grefco Corporation. Sufficient silica should be present in the system to react with the theoretical amount of fluorides contained in the rock, and sufficient silica will normally be present when phosphate rock matrix is used. The fluorides thus may be present in the solution as calcium fluosilicates.

The product resulting from the initial reaction comprises a relatively low concentration of suspended solids (e.g., in the range of 3 to 15 wt %), in the solution of monocalcium phosphate and phosphoric acid. This mixture is preferably then passed to a suitable separation device(s) such as a thickener, decanter, flotation device, etc. for separation of the solids, i.e., slimes and/or sludge and sand, from the solution, to produce a clarified solution of monocalcium phosphate/phosphoric acid. Normally this separation is conducted at about the reaction temperature of the acidulation reaction in order to preclude solids precipitation and conserve energy.

After separation of the insoluble materials comprising sand and sludge, there results a clarified solution of monocalcium phosphate and phosphoric acid still at about the reaction temperature. At this stage of the invention, a number of options are available, depending on the products desired to be produced. In one main embodiment, the process is carried out so as to produce phosphoric acid. In a second main embodiment, the process is carried out so as to produce monocalcium phosphate or a solution of monocalcium phosphate and phosphoric acid. It should be understood that the process is sufficiently versatile that any ratio of monocalcium phosphate and phosphoric acid may be obtained from the system.

It will be understood that these options involve processing of the $MCP/H_3PO_4$ solution after clarification to remove fluorides and silica and recover solid monocalcium phosphate and/or a solution of monocalcium phosphate in phosphoric acid. The latter products are in a suitably pure form to produce a variety of useful products as described herein and also provide recycle phosphoric acid for the acidulation reaction. Thus, it will be understood that these embodiments include defluorination and product recovery.

A main embodiment of the reaction is used when it is desired to simply add an alkali metal salt to the solution to precipitate the fluosilicate and recover a solution of MCP in phosphoric acid. In this embodiment, to the monocalcium phosphate/ phosphoric acid solution, while at about the reaction temperature, is added an alkali metal salt to provide $R_2O$ values, where R is alkali metal. Under these conditions, the alkali metal fluosilicate will precipitate with some $SiO_2$ and can be removed from the resulting phosphoric acid solution still containing monocalcium phosphate within the solution. In this specification, the alkali metal salt added to effect precipitation of fluorides is referred to as providing $R_2O$ values in the system such as $K_2O$ or $Na_2O$. The phosphoric acid solution can then be removed to a gypsum crystallizer for the recovery of the phosphoric acid and/or production of other useful products. In a further option at this stage, the temperature could be lowered without precipitation of monocalcium phosphate if the molar ratio of $P_2O_5$ to CaO in the solution is kept in the range of 8:9:1.

In a second embodiment for the production of the MCP/phosphoric acid, the solution of monocalcium phosphate and phosphoric acid is removed to a crystallizer where the alkali metal salt is added with the reduction in temperature to the range of about 40°-60° C. Under these conditions, there will be precipitated a mixture of monocalcium phosphate and alkali metal fluosilicate which is separated from the $MCP/H_3PO_4$ solution. In this embodiment, water is then either present or is added to the $R_2SiF_6$-MCP mixture and the resulting mixture is subjected to hydrolysis to convert the alkali metal fluosilicate to a mixture of calcium fluoride and silicon dioxide which is separated from the system. The alkali metal salt recovered and any other components can be reused to precipitate additional alkali metal fluosilicate.

As pointed out above, an important aspect of the present invention resides in the concept of hydrolyzing the fluosilicate product to recover the fluorides as calcium fluoride and silica, and regenerating the alkali metal component for reuse in the system to precipitate additional alkali metal fluosilicate. In the first of the above-described options, it will be noted that the alkali metal fluosilicate is precipitated alone, whereas in the second option a mixture of alkali metal fluosilicate and monocalcium phosphate is precipitated. Where there is not already some monocalcium phosphate combined with the alkali metal fluosilicate, it will be necessary to add a calcium salt or equivalent material, together with the necessary water to affect the hydrolysis reaction. The hydrolysis reaction is explained in greater detail hereinafter. In the second embodiment, however, the optimum procedure includes the precipitation and crystallization of sufficient monocalcium phosphate in admixture with the alkali metal fluosilicate to supply the calcium necessary to cause the hydrolysis reaction to go to completion with the precipitation of the fluorides as calcium fluoride and silica.

In a second main embodiment or option of the process of the present invention, the reaction is conducted so as to recover monocalcium phosphate and a solution of monocalcium phosphate in phosphoric acid. In this embodiment, sufficient alkali metal is added to the MCP/H$_3$PO$_4$ solution to precipitate alkali metal fluosilicate which is removed, leaving a solution product of monocalcium phosphate in phosphoric acid. In the second aspect, cooling and crystallization is initially carried out to recover monocalcium phosphate as a product after which alkali metal is added to the resulting solution to form alkali metal fluosilicate which is precipitated from the remaining phosphoric acid solution remaining.

In the first of these embodiments, the solution of monocalcium phosphate and phosphoric acid at substantially the acidulation temperature is cooled in a crystallizer to a temperature of about 40°–60° C. to recover any desired portion of the monocalcium phosphate. The remaining solution of monocalcium phosphate in phosphoric acid is then removed to a crystallizer to which sufficient alkali metal is added as an alkali metal salt to form alkali metal fluosilicate which crystallizes and is removed from the system thus providing a solution of monoclacium phosphate and phosphoric acid as a product. In this reaction, the alkali metal fluosilicate could then be reacted with a calcium reagent, either from the system or with an external source of calcium, together with water, to hydrolyze the alkali metal fluosilicate to calcium fluoride and silicon dioxide with recycle of alkali metal values in phosphoric acid solution.

In the second aspect of this embodiment for recovery of monocalcium phosphate, the monocalcium phosphate/phosphoric acid solution at the reaction temperature is initially subjected to crystallization, preferably under vacuum to crystallize and precipitate monocalcium phosphate as a product. This product would then be removed from the system, although it may be desired to use a portion to affect the hydrolysis reaction. In the meantime, the resulting phosphoric acid solution, which still contains some monocalcium phosphate, is removed to a defluorination reactor to which alkali metal salt is added to precipitate alkali metal fluosilicate. The alkali metal fluosilicate is then hydrolyzed with the addition of a calcium compound and water with separation of the calcium fluoride-silicon dioxide precipitate. The alkali metal salt and any phosphoric acid or liquids, in the system, are then recycled.

It will thus be understood from the above that important aspects of this invention reside in the versatility of the process and that one may produce phosphoric acid, monocalcium phosphate, or any combination of these products. Obviously, either of the products may be further processed to form more valuable materials, as described herein.

A further feature of the invention is that the products are recovered without the contamination of fluoride components originally present in the rock. Thus, as will be noted, means are always provided for separation of the fluorides as fluosilicate by the addition of an alkali metal salt to precipitate the alkali metal fluosilicate. This alkali metal fluosilicate precipitate may then be processed by a hydrolysis reaction in the presence of water and an alkaline earth metal, preferably a source of calcium, to convert the fluorides to calcium fluoride in admixture with the precipitated silicon dioxide. This is a solid product which can then be separated from the process liquids with recycle of the process liquids so that the alkali metal added to the system is simply recovered and recycled together with other liquids. The hydrolysis reaction may be described by the following equation where the alkali metal is potassium and the calcium ion is provided by the monocalcium phosphate:

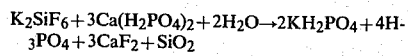

$$K_2SiF_6 + 3Ca(H_2PO_4)_2 + 2H_2O \rightarrow 2KH_2PO_4 + 4H_3PO_4 + 3CaF_2 + SiO_2$$

In the preferred reaction system, there are a total of 27 moles of monocalcium phosphate in solution. Of this amount, up to 8 moles may theoretically be removed as crystalline monocalcium phosphate. In practice, however, about 4 to 5 moles of solid MCP are preferably recovered in that option since up to 1 mole may be lost with the sludge, and another 2 moles will be needed for the hydrolysis reaction if used for that purpose. The remaining 19 moles remain dissolved in the phosphoric acid, preferably in about 90 moles H$_3$PO$_4$. Essentially, all of the calcium is eventually removed as gypsum and a total of 34% as P$_2$O$_5$ provides the requirement for recycle phosphoric acid after the gypsum formation step.

One important embodiment or option of the invention is the utilization of a portion of the calcium from phosphate rock to remove fluorides as 3CaF$_2$ and/or 3CaF$_2$.SiO$_2$ and thereby eliminate the need for use of an external source of calcium such as limestone. A sufficient amount of calcium can be precipitated in the underflow from the R$_2$SiF$_6$ separation. If not, however, additional calcium may be added as lime, limestone, calcium phosphates, or other calcium salt. While the alkali ion (K or Na) is a critical component of this sytem, it is not consumed, but simply recycled to perform the required fluoride removal function. As a consequence, the cost of K$_2$O or Na$_2$O in fluoride removal is not a significant factor since only makeup K$_2$O of Na$_2$O will be needed as governed by losses of potassium ion from the system.

A further feature of the invention is that substantial amounts of the fluorides are not evolved during acidulation but rather remain in solution even when the monocalcium phosphate is crystallized and removed. The fluorides are subsequently removed as the alkali metal fluosilicate alone or in the presence of MCP as described above. In precipitation of the fluorides, any of several alkali metals may be added to the system. Thus, the alkali metal may be added as any salt or compound of potassium or sodium which is compatible with the system and will react with the silica and fluoride to produce insoluble alkali metal fluosilicates in the system. Mixtures may also be used. Suitable alkali metal materials which may be used are those of the formula RH$_2$PO$_4$, R$_2$HPO$_4$, R$_2$CO$_3$, R$_2$HCO$_3$, R$_2$SO$_4$, RHSO$_4$, ROH or the like, where R is alkali metal. Suitable specific materials are NaH$_2$PO$_4$, NaOH, KH$_2$PO$_4$, KOH, natural or synthetic Na$_2$CO$_3$ or NaHCO$_3$, such as trona. Potassium compounds are highly preferred because of the fertilizer value of potassium and the invention will be described hereinafter using potassium ion, usually $KH_2PO_4$, as the $K_2O$ source. The potassium is usually added as $KH_2PO_4$, KOH or mixture in solution, and preferably as recycle $K_2O$ from the hydrolysis step.

On addition of the alkali metal ion, the fluorides precipitate as solid $K_2SiF_6$ when the alkali metal is potassium, usually with some silica from the rock. In a preferred embodiment, the solid fluosilicate is then hydrolyzed by reaction with calcium and water. The hydrolysis reaction may then be carried out by heating the mixture at a temperature of about 100° to 115° C., or up to the reflux point. If silicon dioxide was not added to the initial acidulation reaction, a sufficient amount of silicon dioxide may be added at this stage to convert all the fluorides to $K_2SiF_6$. Calcium ion and water may have to be added if MCP is not precipitated with the $K_2SiF_6$.

Separation of the $K_2SiF_6$ solids is usually conducted in a thickener and the solids comprise the underflow. The underflow is usually a slurry of monocalcium phosphate with as small an amount as possible of phosphoric acid solution, together with the fluorides, usually as potassium fluosilicate. Sufficient calcium phosphate may be present to react with the $K_2SiF_6$, but an external source of calcium ion may be added if necessary. An excess of calcium is preferred for more complete conversion. A feature of this invention is that this mixture is hydrolyzed, preferably by heating at 100°–115° C. or up to the reflux point, to form potassium dihydrogen phosphate and convert the fluorides to calcium fluoride and silicon dioxide. When calcium ion and potassium fluosilicate react in the hydrolysis state, a solid calcium fluoride-silica mixture and $KH_2PO_4$ acid are produced together with process liquids.

After recovery of the solid fluoride compound, the resulting solution is suitable for recycle to the system to provide at least a portion of the potassium ion necessary to produce additional potassium fluosilicate in the defluorination reaction. As a result, most of the $SiO_2$ and $K_2O$ are not consumed in the reaction, but rather are recycled in the continuous process. It is, of course, to be understood that additional amounts of potassium ion and $SiO_2$ from external sources may be added as may be required by the system.

Conversions of the $R_2SiF_6$ with calcium ion results in the production of calcium fluoride, $CaF_2$, commonly known as fluorspar, usually in admixture with some silica or $SiO_2$. The $3CaF_2 \cdot SiO_2$ mixture can be separated and recovered by conventional means.

From the defluorination reactor or fluoride precipitator, a solution of clarified phosphoric acid containing monocalcium phosphate is also recovered as overflow from a thickener. A portion of the phosphoric acid solution may be recovered for use as desired including conversion to other useful products. In a continuous process, a sufficient amount of the phosphoric acid is regenerated and recycled to the acidulation reactor to solubilize the phosphate rock.

In a main embodiment, at least a portion of the remaining monocalcium phosphate/phosphoric acid solution is reacted with sulfuric acid to produce calcium sulfate hydrate which may be recovered for use as desired. The phosphoric acid generated as a result of this reaction may be recovered as product with at least a portion recycled to the main reactor to effect acidulation of the phosphate rock feed. In a further main embodiment, a portion of the solid MCP which was crystallized may be withdrawn and reacted with $K_2SO_4$ or the like.

In a second embodiment, a portion of this monocalcium phosphate/phosphoric acid solution may be withdrawn and reacted with potassium sulfate, potassium bisulfate or mixtures thereof to produce $KH_2PO_4/H_3PO_4$ solutions and gypsum from which $KH_2PO_4$ may be recovered as a fertilizer grade material by precipitation or extraction with an organic solvent as taught in U.S. Pat. No. 3,718,453.

The invention is described in the flow sheet of FIG. 1 accompanying the application. As shown in this Figure, phosphate rock from line 1 is acidulated with recycle phosphoric acid from line 2 in acidulation reactor 3, the reaction being conducted at a temperature in the range of about 70° to 100° C. utilizing an excess of phosphoric acid so that fluorides can be subsequently precipitated. The reaction is preferably carried out in a series of reactors with countercurrent contact to assure complete reaction. Some dissolved potassium fluosilicate may be present in the recycle phosphoric acid. A portion of this fluoride in the rock is dissolved, but some may report to the sludge fraction as complex insoluble compounds. A defoaming agent may be added if necessary.

On completion of the acidulation reaction, the resulting slurry is passed by line 4 to separator 5 at generally the acidulation temperature where sand, sludge and other insolubles are removed by line 6. Mother liquors recovered from the sand and sludge are combined with thickener overflow. A flocculating agent and/or filter aid may be added if necessary to achieve good separation at this stage.

At this stage of the process, the options discussed above are utilized. Thus, the clarified stream in line 7 containing the solution of monocalcium phosphate in phosphoric acid is then subjected to defluorination with recovery of either phosphoric acid, monocalcium phosphate, or any combination of these desirable products. These options are described in FIG. 1 as defluorination and product recovery 8. The particular options for processing are described in FIGS. 2, 3, 4 and 5, which will thereafter result in the production of either monocalcium phosphate and/or a phosphoric acid solution as described.

Figure 2:
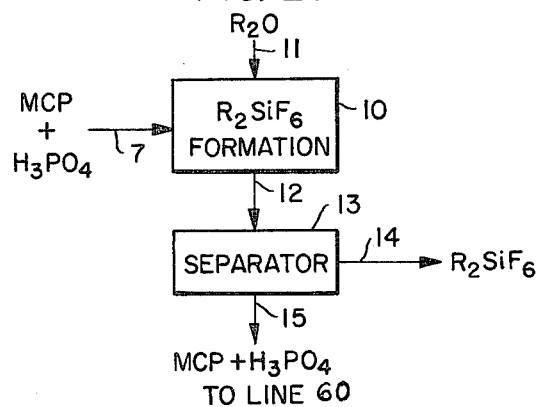
FIG. 2 is a flow sheet showing one embodiment for defluorination and product recovery.

In the first option, the monocalcium phosphate/phosphoric acid stream from FIG. 1, shown in line 7 of FIG. 2, maintained at the acidulation temperature range of 70°–100° C., preferably 60°–80° C., is passed to defluorination or $R_2SiF_6$ formation station 10, while maintained at the same temperature. At this stage, sufficient alkali metal salt, preferably $KH_2PO_4$, is added by line 11 with good agitation. A sufficient amount of the alkali metal salt is added to react with at least the theoretical amount of fluoride contained in the system. At these temperatures and under these conditions the alkali metal fluosilicate will precipitate. The mixture is thus removed from the system via line 12 to separator 13 where the $R_2SIF_6$ solid is removed at 14. The filtrate recovered at 15 is a solution of monocalcium phosphate in phosphoric acid which is then removed and subjected to processing in line 60, as described hereinafter for FIG. 1.

In the meantime, the alkali metal fluosilicate recovered at 14 is removed from the system and may be reacted with a source of calcium ion, such as calcium oxide or monocalcium phosphate, together with an excess of water in order to affect the hydrolysis reaction by heating as described at 100° to 115° C. From the hydrolysis reaction is recovered a mixture of calcium fluoride and silicon dioxide which is separated as a solid and may be processed as described herein. The process liquids containing alkali metal ion and water and perhaps some phosphoric acid is then recycled to line 11 for reuse in the system.

While this embodiment states that the temperature maintained in defluorination should be in the same range as the acidulation temperature, a further option is that the temperature could be lowered at this stage if the $P_2O_5$ to CaO molar ratio in the solution remains in the range of 8:1 to 9:1 to prevent precipitation of monocalcium phosphate with the fluosilicate.

Figure 3:
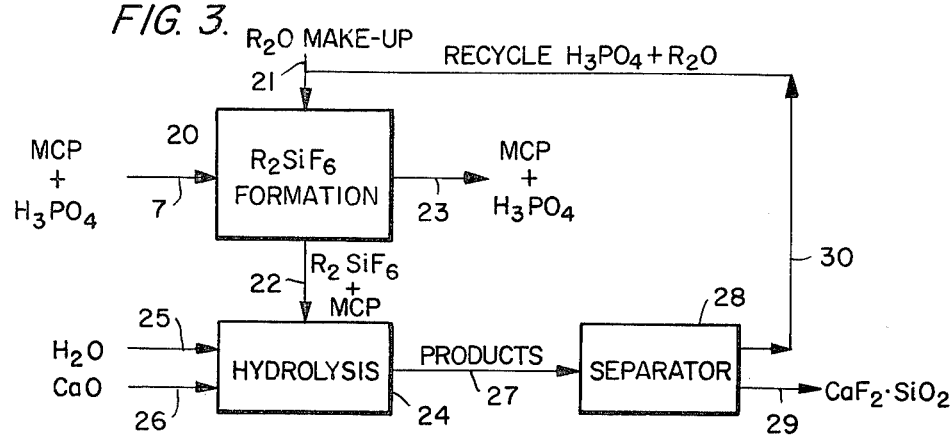
FIG. 3 is a flow sheet showing a further embodiment for defluorination with hydrolysis and product recovery.

A second embodiment of this reaction for effecting the defluorination is shown in FIG. 3. In this embodiment, the monocalcium phosphate/ phosphoric acid solution from line 7 (FIG. 1) is passed to defluorination stage 20 where the temperature is lowered to the range of about 40°–60° C. Alkali metal ion is then added in the form of an alkali metal salt, preferably as $KH_2PO_4$ by line 21 in sufficient amounts to precipitate the theoretical amount of fluoride contained in the system as alkali metal fluosilicate. When lowering the temperature, however, there will also be precipitated at least a portion of monocalcium phosphate which will serve as a source of calcium ion for hydrolysis of the fluosilicate at 24. The precipitate is removed by line 22 and the $MCP/H_3PO_4$ product solution is recovered by line 23. To the hydrolysis stage 24 is added sufficient water by line 25 and any additional calcium by line 26 which may be necessary to affect the hydrolysis reaction. The hydrolysis reaction is then completed by heating as described with removal of products by line 27 to separator 28. The $CaF_2.SiO_2$ solid is removed at 29 and process liquids containing alkali metal ion and any aqueous materials are recycled by line 30 to be reused with any make-up alkali metal. In this embodiment, a portion of the monocalcium phosphate has been removed for hydrolysis so that the resulting solution in line 60 in FIG. 1 will contain a lesser amount of monocalcium phosphate in the phosphoric acid than shown in the embodiment of FIG. 2.

After completion of either of these options, the resulting solution of monocalcium phosphate and phosphoric acid is then passed by line 60 for further processing as described.

Figure 4:
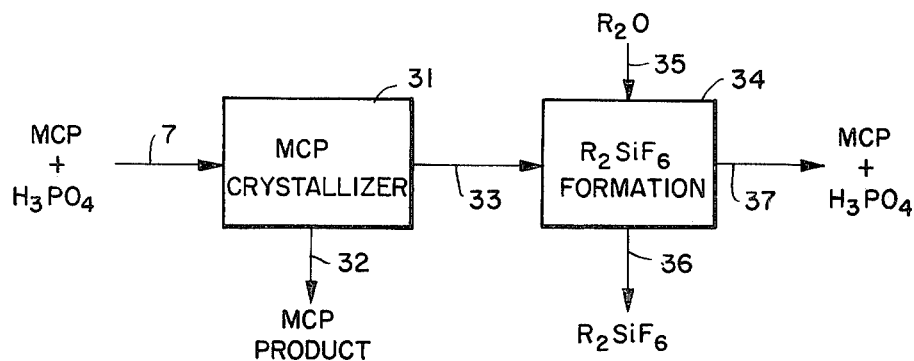
FIG. 4 is a flow sheet showing monocalcium phosphate recovery followed by defluorination.
Figure 5:
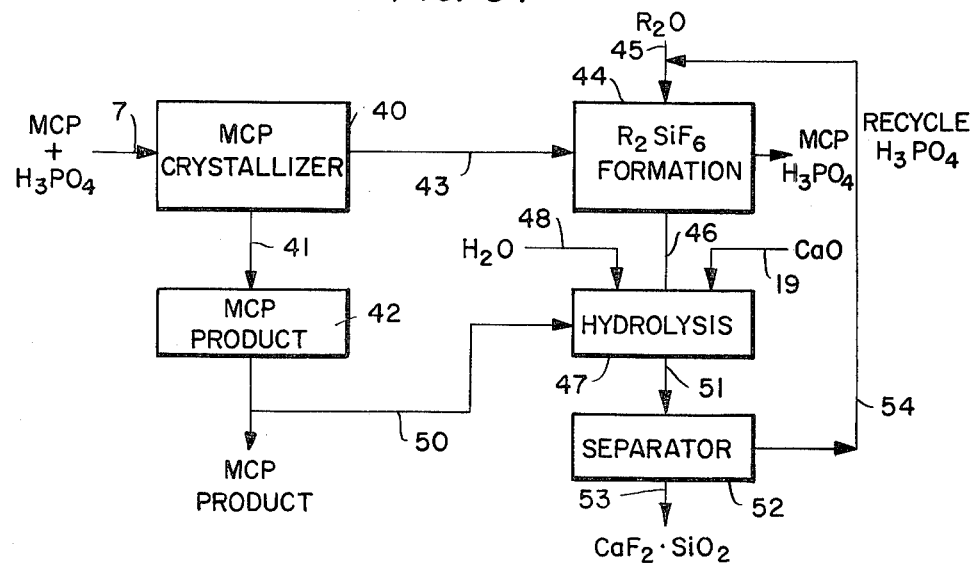
FIG. 5 is a flow sheet showing monocalcium phosphate recovery followed by defluorination and hydrolysis.

The embodiments of FIGS. 4 and 5 describe the system wherein solid monocalcium phosphate is recovered for conversion to valuable products. In the embodiment of FIG. 4, the monocalcium phosphate/phosphoric acid solution from line 7, maintained at the acidulation temperature, is passed to a crystallizer 31 where it is cooled by about 20°–40° C. or to the temperature range of about 40°–60° C. to precipitate as much monocalcium phosphate as desired from the solution. This precipitated MCP product is removed by line 32 and may be treated, as known in the art, to produce useful products. Thus, reaction with sulfuric acid will form high quality gypsum and high quality phosphoric acid.

In the meantime, the resulting phosphoric acid solution, still containing some monocalcium phosphate, is passed by line 33 to defluorination 34 to which an alkali metal salt such as $KH_2PO_4$ is added by line 35 to precipitate the fluorides as alkali metal fluosilicates. The alkali metal fluosilicates are then removed from the system at 36. There is then recovered as process liquids the solution of monocalcium phosphate in phosphoric acid at 37 which may be processed as described in FIG. 1, in line 60.

In the meantime, the alkali metal fluosilicate removed from the system may be treated as desired, but preferably is reacted with a source of calcium and water and hydrolyzed to recover calcium fluoride with recycle of the process liquids as described for embodiments of FIGS. 2 and 3.

In FIG. 5, a further option is described wherein the monocalcium phosphate/phosphoric acid solution from line 7 is initially subjected to vacuum crystallization at 40 at 40°–60° C. to remove by line 41 monocalcium phosphate as a solid product at 42. The resulting phosphoric acid solution is then removed by line 43 to defluorination 44 and an alkali metal salt such as $KH_2PO_4$ is added by line 45 to precipitate alkali metal fluosilicates. These alkali metal fluosilicates are then removed by line 46 and hydrolyzed at 47 with the addition of water from line 48 and a source of calcium by line 49, either as an external source or a portion of the monocalcium phosphate product from line 50. After hydrolysis, the mixture is removed by line 51 to separator 52 where the calcium fluoride silicon dioxide product is separated and recovered at 53. The alkali metal ion and process liquids are recycled by line 54 in the manner described for FIGS. 2 and 3. The $MCP/H_3PO_4$ product is recovered at 55 and may be treated as described at line 60 of FIG. 1.

As shown in FIG. 1, the MCP product may be recovered at line 61 and the $CaF_2.SiO_2$ or $R_2SiF_6$ product may be recovered at line 62 from defluorination and product recovery stage 8.

After completion of the desired processing of FIGS. 2, 3, 4 or 5, there is recovered in line 60 a solution of monocalcium phosphate in phosphoric acid. This solution may be treated in any desired manner for recovery of useful products, as by reaction of a portion with $KHSO_4$ and/or $K_2SO_4$, to produce potassium phosphate such as $KH_2PO_4$, which is a valuable fertilizer product. A portion may also be reacted with sulfuric acid to produce phosphoric acid for recycle to serve as the phosphoric acid reactant in the acidulation reactor. Thus, in this embodiment, the phosphoric acid solution from defluorination stage 8 is passed by line 60 to a gypsum reactor 63 where the $H_3PO_4/MCP$ is reacted with the appropriate amount of sulfuric acid from line 64 to form and precipitate gypsum. This reaction is conducted at atmospheric pressure at 40°–80° C. with good agitation. This mixture is then passed by line 65 to gypsum thickener 66. From thickener 66 overflow phosphoric acid suitable as recycle is removed by line 67 to be recycled via lines 68 and 2. The underflow is removed by line 69 to a filter or a centrifuge 70 and the gypsum recovered at line 71 as a relatively pure product. The gypsum may be washed with water, and the water wash may be recycled to the gypsum crystallizer. The process liquids from the gypsum filter comprise a phosphoric acid solution suitable for recovery through line 72, but at least a portion is recycled by lines 68 and 2 to provide phosphoric acid for the acidulation reaction. The amount of phosphoric acid recovered depends on the amount of $P_2O_5$ removed as MCP and the amount recycled.

In an alternative embodiment, a portion of the $MCP/H_3PO_4$ solution from line 60 may be withdrawn by line 72 to gypsum reactor 74 where it is reacted with $KHSO_4$ and/or $K_2SO_4$ from line 75. This reaction is also conducted at 40°–70° C. with good agitation. Reaction with $K_2SO_4$ forms $KH_2PO_4$ and reaction with $KHSO_4$ forms a mixture of $KH_2PO_4$ and $H_3PO_4$, both of which are valuable products. The reaction mixture is removed by line 76 to separator 77 from which gypsum product is recovered at line 78. The $KH_2PO_4/H_3PO_4$ solution product is recovered at line 79.

As may be noted from this flow sheet, the process provides for the recovery of substantially pure monocalcium phosphate, calcium fluoride/ $SiO_2$, gypsum and phosphoric acid suitable for recovery or recycle in the system. These products are recovered in the substantial absence of fluoride evolution and thus overcome a significant environmental problem caused by fluoride pollution.

In further embodiments of this invention, the monocalcium phosphate may be converted to other useful products, especially fertilizer products. Thus, the monocalcium phosphate may react with potassium sulfate or potassium hydrogen sulfate to form $KH_2PO_4$ as illustrated by the following equations:

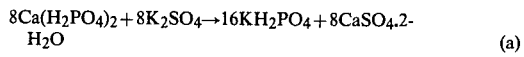  (a)

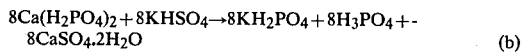  (b)

The following examples are presented to illustrate the invention but it is not considered to be limited thereto. In these examples and throughout the specification parts are by weight unless otherwise indicated.

EXAMPLE I

In this example, 1,278 grams (=9 moles) $P_2O_5$ in phosphate rock are reacted with 10,224 grams (=72 moles) $P_2O_5$ as 35% recycle phosphoric acid for a $P_2O_5$ (acid)/$P_2O_5$ (rock) weight ratio of 8/1 by countercurrent contact. This reaction mixture provides enough excess phosphoric acid to dissolve essentially all of the calcium in the phosphate rock as monocalcium phosphate wherein the $P_2O_5$/CaO weight ratio should approach 6.75/1. The acidulation reaction is conducted at 80°-90° C. Sand, some sludge and unreacted phosphate rock also remain insoluble. Small amounts (up to 304 ppm) of a defoaming agent are helpful in preventing foaming of the acidulation reaction.

This thin reaction slurry, still at 90° C., is then separated via a decanter/thickener (separatory funnel for small amounts), wherein approximately 10% $P_2O_5$ in the reaction slurry remains with the underflow insolubles. The resulting clear solution is then cooled to 60° C. and monocalcium phosphate (MCP) allowed to crystallize and settle. Approximately 50% of the theoretical amount of MCP present is removed from the slurry. The solid MCP is recovered by filtration.

The phosphoric acid filtrate solution is then subjected to defluorination by the addition of sufficient $KH_2PO_4$ in aqueous solution, a portion of which is recycled, to react with the fluoride present. Sufficient reactive silica ($SiO_2$) is added to convert substantially all the fluoride to $K_2SiF_6$. At 60° C. and with agitation, the reaction occurs with precipitation of solid $K_2SiF_6$. The slurry is separated with a decanter/thickener and the underflow solids comprising $K_2SiF_6$ with some MCP/$H_3PO_4$ liquid recovered. The solids underflow is directed into the hydrolysis sector wherein the temperature is raised to 110°-115° C., by use of low pressure steam. Under these conditions, the hydrolysis reaction is essentially completed in 1 to 2 hours. The slurry now contains dense crystalline solid $CaF_2.SiO_2$ mixture which is readily separated by filtration. The filtrate comprising $H_3PO_4$ and $KH_2PO_4$ is recycled to the defluorination stage.

The phosphoric acid overflow solution from the thickener, which still contains the bulk of the monocalcium phosphate is reacted with sulfuric acid in stoichiometric amounts at 75° C. to produce calcium sulfate dihydrate which crystallizes from solution and is filtered off and removed from the system. The resulting filtrate is phosphoric acid of which sufficient amount is recycled to the acidulation reactor to effect acidulation of additional phosphate rock and the remainder is recovered.

EXAMPLE II

This example demonstrates the acidulation reaction of the invention using low grade phosphate rock or matrix.

In each of these experiments five hundred grams of 35% $P_2O_5$ synthetic phosphoric acid recycle stream were placed in a reactor. The glass reactor was sealed, and the liquid was heated to 80° C. and was stirred overnight. Then, the phosphate-containing Low Grade Product from Florida was added, and the heating and stirring were continued. After 24 hours the slurry was vacuum-filtered in a hot box, and two samples of the strong filtrate were prepared for analysis. The residue was washed with approximately 200 grams of hot water while the vacuum filtration system was operative. Two samples of the wash water were prepared for analysis. The residue was dried overnight at 105°-110° C. The net weight of the residue was recorded; the residue was ground and analyzed. The only components analyzed were Ca and $P_2O_5$.

The results of each of these experiments are shown in the following Table I.

TABLE I

| | | | | | | | | | | |
|---|---|---|---|---|---|---|---|---|---|---|
| ACIDULATION OF LOW GRADE PRODUCT - Temp. 80° C. | | | | | | | | | | |
| Exp. No. | Grams of Low Grade Product | $P_2O_5$ (total) / CaO (total) | Feed (grams) | | Filtrate (grams) | | | Residue Wash (grams) | | |
| | | | Ca | $P_2O_5$ | Wt | Ca | $P_2O_5$ | Wt | Ca | $P_2O_5$ |
| 1 | 20 | 15.71 | 8.08 | 177.69 | 480.9 | 6.44 | 172.73 | 217.8 | 0.30 | 6.58 |
| 2 | 40 | 9.31 | 14.02 | 182.68 | 509.9 | 12.49 | 178.12 | 201.4 | 0.41 | 2.66 |
| 3 | 60 | 6.72 | 19.96 | 187.66 | 507.3 | 15.02 | 182.62 | 211.2 | 1.56 | 15.46 |
| 4 | 70 | 5.93 | 22.93 | 190.16 | 557.2 | 16.61 | 192.35 | 206.2 | 1.15 | 11.13 |
| 5 | 80 | 5.31 | 25.90 | 192.65 | 430.1 | 13.85 | 149.73 | 257.6 | 3.76 | 35.40 |
| 6 | 80 | 5.31 | 25.90 | 192.65 | 532.3 | 15.70 | 177.16 | 206.0 | 2.39 | 21.96 |
| 7 | 80 | 5.31 | 25.90 | 192.65 | 548.5 | 15.14 | 178.53 | 151.2 | 1.03 | 10.34 |

| Exp. No. | Residue (grams) | | | Material Balance | | % Ca Dissolved from Solids | % $P_2O_5$ Conversion[1] |
|---|---|---|---|---|---|---|---|
| | Wt | Ca | $P_2O_5$ | Ca | $P_2O_5$ | | |
| 1 | 8.9 | 0.01 | 0.03 | 83.5 | 100.9 | 99.8 | 99.8 |
| 2 | 14.6 | 0.22 | 0.07 | 93.6 | 99.0 | 98.1 | 100.1 |

TABLE I-continued

ACIDULATION OF LOW GRADE PRODUCT - Temp. 80° C.

| | | | | | | | |
|---|---|---|---|---|---|---|---|
| 3 | 24.8 | 0.64 | 0.64 | 86.3 | 105.9 | 92.8 | 95.7 |
| 4 | 34.6 | 4.15 | 1.86 | 95.6 | 108.0 | 80.0 | 89.3 |
| 5 | 50.7 | 5.06 | 9.89 | 95.4 | 101.2 | 78.7 | 50.4 |
| 6 | 46.8 | 5.07 | 9.47 | 89.5 | 116.3 | 78.6 | 52.4 |
| 7 | 44.5 | 4.44 | 7.82 | 86.7 | 102.1 | 81.3 | 60.8 |

$$^1P_2O_5 \text{ Conversion} = \frac{\text{Wt. } P_2O_5 \text{ in LCP} - \text{Wt. } P_2O_5 \text{ in Residue}}{\text{Wt. } P_2O_5 \text{ in LCP}} \times 100$$

According to the data given in the above Table I, the synthetic acid stream will dissolve most of the $P_2O_5$ and Ca from slurries of Low Grade Product (LGP) if the ratio of Total $P_2O_5$/Total CaO is high. However, as the ratio of Total $P_2O_5$/Total CaO decreases, i.e., more LGP is present in the slurries, the percent $P_2O_5$ conversion begins to decrease. When the $P_2O_5$/CaO ratio was decreased from 5.9 to 5.3, there was an obvious decrease in percent $P_2O_5$ conversion. When the ratio of $P_2O_5$/CaO was 5.3 (13.8% slurry), the average $P_2O_5$ conversion of the three runs was 54.5%.

In the pure, three component system the saturation level of calcium is 3.9% in 35% $P_2O_5$ at 80° C. as shown by K. L. Elmore and T. D. Fare, *Industrial and Engineering Chemistry*, 32(4), 580 (1940). Experiment No. 7, which employed 70 grams of LGP and 500 grams of acid, yielded a filtrate containing 3.0% calcium. Experiments 6, 8 and 9, each of which had 80 grams of LGP and 500 grams of acid, also produced a filtrate containing an average of 3.0% calcium. Equilibrium solubilities tests indicate that the solubility of calcium in this filtrate should be higher than the corresponding pure, three component system. This shows that the reaction is limited by some factor other than the solubility of calcium.

It is possible that the acidulation of apatite may be limited by the pH of the liquid phase. As calcium is dissolved, it displaces hydrogen ions in the phosphoric acid, raising the pH of the solution. This effect has been noted for dissolved potassium, as dissolved potassium greatly increased the quantity of recycle acid required to obtain the same conversion. Above a threshold pH, additional dissolved calcium may result from the acidulation of calcium carbonate or other sources rather than the acidulation of apatite. This means that high $P_2O_5$ conversion and crystallization of monocalcium phosphate from the filtrate may be mutually exclusive goals when a batch or co-current acidulation system is used.

The data presented in Table I indicates that the minimum ratio of Total $P_2O_5$/Total CaO is 5.3% in slurries of Low Grade Product from Florida and 35% $P_2O_5$ synthetic recycle acid. When more solids are added to the acid, i.e., the $P_2O_5$/CaO ratio decreases, and the $P_2O_5$ conversion based on the LGP is less.

EXAMPLE III

These experiments were to determine the effectiveness and conversion of the hydrolysis reaction using monocalcium phosphate (MCP) only, monocalcium phosphate with fresh or an external source of phosphoric acid, and monocalcium phosphate with wet or recycle process phosphoric acid. The following Table II shows the feed analysis, filtrate analysis, conditions and conversion.

TABLE II

| | MONOCALCIUM PHOSPHATE ONLY | | | MCP with furnace $H_3PO_4$ | MCP with wet process $H_3PO_4$ |
|---|---|---|---|---|---|
| Run No. | A | B | C | D | E |
| FEED (g) | | | | | |
| $K_2SiF_6$ | 25.0 | 25.0 | 25.0 | 25.0 | 25.0 |
| MCP | 85.8 | 85.8 | 98.7 | 90.9 | 91.9 |
| $H_3PO_4$(85%) | — | — | — | 185.3 | 245.0 (36% $P_2O_5$) |
| $H_2O$ | 171.6 | 171.6 | 185.6 | 163.1 | 62.3 |
| FILTRATE (%) | | | | | |
| Ca | 0.77 | 0.7 | 0.66 | 2.34 | 4.23 |
| $K_2O$ | 4.38 | 3.21 | 3.40 | 2.02 | 0.68 |
| $P_2O_5$ | 19.15 | 17.56 | 19.11 | 41.50 | 37.96 |
| $SO_4$ | 0.08 | 0.04 | 0.06 | 0.18 | 0.3 |
| F | — | 0.11 | 0.11 | — | 0.85 |
| CONDITIONS | | | | | |
| Time, min. | 30 | 30 | 60 | 360 | 360 |
| Temp., C. | 108 | 108 | 108 | 108 | 108 |
| $K_2SiF_6$ to soluble $K_2O$ conversion (%) | 74.6 | 79.3 | 85.0 | 71.1 | 36.1 |

As will be noted from the above table, the most effective conversions and recoveries were with MCP per se, especially with MCP and the longer reaction time. It will also be noted that the best conversions and recoveries were obtained with Run C which suggests that an excess of calcium ion should be present for optimum conversions and recoveries.

EXAMPLE IV

This example demonstrates the hydrolysis of potassium fluosilicate with monocalcium phosphate and calcium oxide.

The procedure was as follows:

Weighed amounts of phosphoric acid, calcium monobasic phosphate, and distilled water were added to the reactor flask. A Teflon stirrer was placed in the slurry, the apparatus was assembled; the slurry was heated and stirred for 30 minutes at 80° C. or higher. After 30 minutes, the potassium fluosilicate was added to the mixture in the reaction flask. The initial time was when the slurry began to reflux, and this time was recorded. The hydrolysis was terminated after refluxing the specified time. However, the slurry was heated and stored for a specific time, prior to filtration, in an attempt to remove all the water soluble $K_2O$. The slurry was cooled to 60°–70° C. If the vacuum filtration was completed in a reasonable time, the residue was washed with hot water, vacuum filtered, and dried overnight. The net weights of the filtrate, residue wash solution, and dried residue were obtained.

The warm filtrate was prepared for analysis. The filtrate was diluted with concentrated nitric acid and water and then boiled at low heat for 30 minutes. The ratios varied, but we standardized on 10 ml of filtrate, 15 ml of concentrated nitric acid, and 15 ml distilled water. This treatment was necessary to stabilize the filtrate because the products would crystallize when the concentrated filtrate sat overnight at room temperature. The residue wash solution was sampled and also treated with nitric acid and water.

The dried residue was ground to $-20$ mesh using the vibrating mill. This product was analyzed by wet chemical analysis and by x-ray diffraction.

The details of these experiments are set forth in the following Table III.

$K_2O$ and $P_2O_5$ should be high and the percent calcium and fluoride in the residue would be high.

In these experiments, the calculated moles $P_2O_5$ is based on the MCP, but the calculated moles CaO includes the calcium in the MCP plus the CaO directly added. The moles of CaO (from MCP and CaO) varied between 0.37 and 0.59. If only MCP is used, the mole ratio of $P_2O_5$/CaO has to be 0.92, but this mole ratio can be varied by adding CaO. Sufficient MCP or CaO was used in all the hydrolyses to meet or to exceed the stoichiometric requirements. While Run 9 was deficient in MCP, sufficient CaO was used to meet the stoichiometric requirements of the $K_2SiF_6$.

Three runs, 1, 2 and 3, employed 0.5 hours reflux time, and gave an average $K_2O$ hydrolysis of 75%. The runs, however, which refluxed for an hour and used 115% of the stoichiometric weight of MCP, based on $K_2SiF_6$, had an average hydrolysis of 81%, based on the available data. It appears that this average of $K_2O$ hydrolysis percent will neutralize the normal fluctuations in the $K_2O$ material balance. Theoretically, the percent $K_2O$ extracted in the strong and the repulp filtrates should equal the percent $K_2O$ conversion based on the residue, if the $K_2O$ material balance is 100 percent.

TABLE III
POTASSIUM FLUOSILICATE HYDROLYSIS USING MCP AND CaO

| Run No. | Feed[1] | | | Conditions | | | Stoichiometric Requirements MCP |
|---|---|---|---|---|---|---|---|
| | Grams CaO | Grams MCP | Grams $H_2O$[2] | Time Hrs. | Temp. °C. | Residue Repulped | |
| 1 | 0 | 85.8 | 171.6 | 0.5 | Reflux | No | 100 |
| 2 | 0 | 85.8 | 171.6 | 0.5 | " | No | 100 |
| 3 | 0 | 98.7 | 185.6 | 1.0 | " | No | 115 |
| 4 | 0 | 98.7 | 185.6 | 1.0 | " | No | 115 |
| 5 | 0 | 98.7 | 278.4 | 1.0 | " | No | 115 |
| 6 | 15.0 | 85.8 | 171.6 | 1.0 | " | No | 100 |
| 7 | 15.0 | 85.8 | 171.6 | 1.0 | " | No | 100 |
| 8 | 10.0 | 85.8 | 171.6 | 1.0 | " | No | 100 |
| 9 | 12.0 | 49.4 | 222.9 | 1.0 | " | Yes | 58 |
| 10[6] | 0 | 98.7 | 278.4 | 1.0 | 80° | Yes | 115 |
| 11[8] | 0 | 98.7 | 278.4 | 1.0 | " | Yes | 115 |
| 12[8] | 0 | 98.7 | 278.4 | 1.0 | " | Yes | 115 |
| 13[8] | 0 | 98.7 | 278.4 | 1.0 | Reflux | Yes | 115 |

| Run No. | Moles $P_2O_5$[3] | Mole Ratios Moles CaO[4] | $\dfrac{\text{Moles } P_2O_5}{\text{Moles CaO}}$ | % $K_2O$ extracted based on liquids | % $K_2O$ conversion based on dried residue | % Efficiency of $K_2O$ Recovery[5] |
|---|---|---|---|---|---|---|
| 1 | 0.34 | 0.37 | 0.92 | 72.1 | 74.6 | 73.4 |
| 2 | 0.34 | 0.37 | 0.92 | 69.8 | 79.3 | 74.6 |
| 3 | 0.39 | 0.42 | 0.92 | 75.7 | 85.0 | 80.4 |
| 4 | 0.39 | 0.42 | 0.92 | 76.6 | 86.8 | 81.7 |
| 5 | 0.39 | 0.42 | 0.92 | 77.7 | 87.3 | 82.8 |
| 6 | 0.34 | 0.59 | 0.57 | 85.7 | 65.6 | 75.6 |
| 7 | 0.34 | 0.59 | 0.57 | 90.4 | 85.8 | 88.1 |
| 8 | 0.34 | 0.52 | 0.65 | 82.2 | 91.1 | 86.6 |
| 9 | 0.20 | 0.39 | 0.50 | 77.9 | 84.5 | 81.2 |
| 10[6] | 0.39 | 0.42 | 0.92 | 103.8[7] | 87.2[7] | 95.5[7] |
| 11[8] | 0.39 | 0.43 | 0.91 | 96.0 | 86.2 | 96.1 |
| 12[8] | 0.39 | 0.43 | 0.91 | 96.5 | 89.4 | 93.0 |
| 13[8] | 0.39 | 0.43 | 0.91 | 100.0 | 88.7 | 94.4 |

[1] Used 25 g $K_2SiF_6$
[2] Distilled water - does not include water in MCP
[3] From Monobasic Calcium Phosphate
[4] From MCP plus CaO
[5] (% $K_2O$ extracted + $K_2O$ conversion) × 0.5
[6] Used 21.3 g of $Na_2SiF_6$
[7] % $Na_2O$
[8] $K_2SiF_6$ feed received 9/17/79

The objective of these experiments was to extract the potassium from the potassium fluosilicate, and the products were to be potassium monobasic phosphate and calcium fluoride. The fluoride in the potassium fluosilicate was to be removed as calcium fluoride contaminated with silica (silicon dioxide). In addition to an acceptable material balance, the liquid extraction for Runs 8 and 9 used CaO to supplement or replace the MCP. The original calculations assume the CaO would neutralize the phosphoric acid produced, but other reactions are likely.

From the above data, it appears that the most significant influence is the variation in rates of hydrolysis. The best hydrolysis was obtained when: the weight of the MCP was 115% of the stoichiometric weight of the $K_2SiF_6$; the hydrolysis time was one hour; the temperature was at reflux (which is approximately 103° C.); the slurry was repulped; and the initial slurry ratio based on $K_2SiF_6$/total feeds was 8.9%.

EXAMPLE V

This example demonstrates the use of cement dust containing CaO (lime) and other components to hydrolyze $Na_2SiF_6$ and $K_2SiF_6$ if a slurry is heated and stirred for one hour at 95° C. The strong filtrate residue should be repulped using identical conditions.

Two containers of cement dust were received from Texas Industries, Artesia, Mississippi. These dusts were obtained from the clinkering (burning) of the raw materials to make cement. As learned previously, calcium oxide hydrolyzes potassium fluosilicate, and this cement dust contains CaO, $K_2SO_4$, $SiO_2$, and oxides of other metals.

Basically the equipment consisted of a hot plate to heat the slurry, a 500 ml reaction flask, a 0.05 hp stirrer and a temperature controller to maintain a constant temperature. Both the hot plate and an electric fan were operated by the controller to either heat or cool the slurry as required to reduce temperature fluctuations. The slurries were filtered in a hot box at 60° C. using a vacuum pump, flask, and large Buchner funnel.

The procedure was as follows.

The equipment was assembled and a weighed amount of water, used to slurry the feeds, was placed in a sealed reactor. The water was heated and stirred to the desired temperature, which was normally 95° C. The potassium fluosilicate was slowly added over a ten minute period. Then the cement dust was added over another 10 minute period. Usually some water vapor had condensed on the funnel used to feed the solids into the hot flask and some of the solids had collected on the funnel. They were washed into the hot slurry. The slurry was stirred and heated until the temperature of the slurry rose again to 95° C. When the slurry temperature rose to 95° C., the time was recorded as the initial time of hydrolysis.

When the hydrolysis was terminated, the hot plate was turned off and the fan cooled the slurry to 60°–70° C. The slurry was filtered at 60° C. in the hot box using the vacuum system. The net weight of the strong filtrate was recorded. The net weights of two aliquots of the hot, strong filtrate were recorded. One was treated with concentrated nitric acid, diluted with water, and boiled at low heat for 30 minutes. This diluted solution was cooled overnight, weighed, and filtered. This acidic aliquot was for $K_2O$, $Na_2O$, and $SO_4$ analyses.

The 10 ml aliquot of the hot, strong filtrate was diluted with 30 ml of water and cooled overnight. The filtrate was weighed, filtered, and placed in a plastic bottle. This aliquot, diluted with water, was for fluoride and $SiO_2$ analyses.

The warm, strong filtrate was poured into a borosilicate bottle and was stored in an oven at 60°–70° C. for later use in a second stage reaction. The residue from the initial filtration was washed into the original reaction flask. The residue was repulped by stirring for an hour at 95° C. The repulp slurry was filtered and sampled as discussed above.

The net weight of the residue was recorded, and the water in the residue was removed by heating overnight in an oven at 105°–110° C. The dry net weight was obtained, the residue was ground to −20 mesh and was analyzed.

In these experiments, the initial feeds were 55 grams of $K_2SiF_6$ and 200 grams of water. It was necessary to make some assumptions concerning the composition of the cement dust based on chemical analyses. It was assumed that the cement dust ions and components were combined in the following general order: $Na_2SO_4 > K_2SO_4 > CaSO_4 > CaO$. 123.2 grams of cement dust containing 25.3% calcium was the stoichiometric equivalent to 55 grams of $K_2SiF_6$. Additional water was used after the feeds were added to the 95 degree slurry to wash all the solids into the hot reaction flask.

The data is set forth in the following Table IV.

TABLE IV

POTASSIUM FLUOSILICATE HYDROLYSIS USING CEMENT DUST

| | Conditions | | Feeds (g) | | | | Weight |
|---|---|---|---|---|---|---|---|
| Run No. | Time Hrs. | Temp. °C. | Slurry water | $K_2SiF_6$ | Cement dust I.D. No. | Wt | Repulp water |
| 1 | 1.0 | 75 | 384[1] | 50 | 81 | 150 | 162[2] |
| 2 | 0.5 | 75 | 365[1] | 55 | 81 | 112 | 187[2] |
| 3 | 0.5 | 75 | 399[1] | 55 | 81 | 123.2 | 86[2] |
| 4 | 0.5 | 75 | 259[1] | 55 | 81 | 123.2 | 64[2] |
| 5 | 0.5 | 95 | 200 | 55 | 81 | 100 | 77[2] |
| 6 | 0.5 | 95 | 215 | 55 | 81 | 100 | 86[2] |
| 7 | 1.0 | 95 | 246 | 55 | 81 | 125 | 230 |
| 8 | 0.5 | 95 | 259 | 0 | 81 | 125 | 273 |
| 9 | 0.5 | 95 | 436 | 0 | 81 | 250 | 436 |
| 10 | 0.5 | 95 | 436 | 0 | 81 | 250 | 432 |
| 11 | 1.0[3] | 95 | 200 | 55 | 81 | 125 | 266 |
| 12 | 1.0 | 95 | 252 | 50[4] | 82 | 125 | 244 |
| 13 | 1.0 | 95 | 252 | 50[4] | 82 | 125 | 306 |
| 14 | 1.0 | 95 | 200 | 55 | —[5] | 110 | 334 |
| 15 | 1.0 | 95 | 270 | 55 | 82 | 125 | 200 |
| 16 | 1.0 | 95 | 221 | 55 | 82 | 125 | 216 |

| | | | | | | % $K_2O$ conversion based on residue | | |
|---|---|---|---|---|---|---|---|---|
| Run No. | Material balance | | | | % $K_2O$ Recovered in Liquids | Total $K_2O$ | $H_2O$ Insoluble $K_2O$ | % $SiO_2$ in residue |
| | Ca | $K_2O$ | F | $SO_4$ | | | | |
| 1 | 90.5 | 109.0 | 95.6 | 105.1 | 88.8 | 79.8 | 70.3 | NA |
| 2 | 73.7 | 110.2 | 93.9 | NA | 78.8 | 68.1 | 90.3 | NA |

TABLE IV-continued
POTASSIUM FLUOSILICATE HYDROLYSIS USING CEMENT DUST

| | | | | | | | | |
|---|---|---|---|---|---|---|---|---|
| 3 | 75.6 | 102.3 | 94.2 | NA | 63.4 | 61.1 | 92.6 | NA |
| 4 | 83.7 | 112 | 97.2 | 99 | 81.3 | 69.5 | 94.4 | 91.3 |
| 5 | 136 | 103.5 | 112 | 86.1 | 68.2 | 64.7 | 98.6 | 100.7 |
| 6 | 117 | 118 | 96.3 | 107.9 | 84.4 | 66.0 | 94.2 | 100.7 |
| 7 | 103.4 | 106.0 | 97.5 | 100.2 | 86.2 | 80.3 | 92.8 | 98.8 |
| 8 | 96.8 | 122 | NA | 99.6 | 118 | 95.6 | 98.1 | 64.0 |
| 9 | — | — | — | — | — | 91.6 | 97.0 | NA |
| 10 | — | — | — | — | — | 90.0 | 99.0 | NA |
| 11 | 95.3 | 97.6 | 90.8 | 98.9 | 83.2 | 85.7 | 95.7 | 94.6 |
| 12 | NA | 97.8 | NA | 99 | 79.2 | 81.4 | NA | NA |
| 13 | 105.6 | 90.7 | 95.7 | 100.9 | 67.3 | 76.6 | NA | NA |
| 14 | 98.8 | 89.3 | 95.6 | 79.3 | 69.6 | 80.3 | NA | NA |
| 15 | 99.9 | 105.6 | 103.7 | 104.5 | 94.3 | 88.8 | 98.1 | 85.9 |
| 16 | 104.1 | 108.3 | 99.3 | 104.9 | 93.6 | 85.3 | 96.5 | 84.3 |

[1] Cement Dust was slurried before adding to reactor.
[2] Residue washed - not repulped.
[3] Air sparged through slurry during hydrolysis.
[4] Substituted $Na_2SiF_6$ for $K_2SiF_6$.
[5] Used residue 9A and B ($K_2SIF_6$ omitted in 9 and 10).

As will be seen from this data, the temperature was 75° C. for Runs 1, 2, 3 and 4. However, the hydrolysis time for Run 1 was one hour. Also, cement dust in excess of the stoichiometric requirements was used, and the efficiency of $K_2O$ recovery was 84%. This was one of the highest for an older $K_2SiF_6$ feed. Chemical analyses gave little difference between cement dust B1 and B2. The average efficiency of $K_2O$ recovery for runs 12, 13 and 14 was 70%.

The strong filtrate sometimes was saturated with potassium sulfate, and this material, crystallized with the strong filtrate, was cooled by vacuum filtration or the volume was reduced by vacuum filtration of the hot slurry. In a continuous countercurrent system, the repulp filtrate would have to be recycled.

Two methods are used to calculate the percent $K_2O$ conversion based on dried residue from the repulp step. The first is based on the total $K_2O$ remaining in the residue, and this gives the percentage of $K_2O$ actually extracted by the strong and repulp filtrates. The second method used the difference between the total $K_2O$ remaining in the residue and the water soluble $K_2O$ remaining in the residue. This difference is the water insoluble $K_2O$, and the conversion based on this gives the maximum available water soluble $K_2O$.

Runs 5 and 6 are duplicate runs and should give parallel results if the material balances were identical. The average efficiency of $K_2O$ recovery was 70.5% but could be increased if all the water soluble $K_2O$ were extracted. The residues for Runs 5 and 6 were washed and not repulped. Most of the silica from the cement dust and $K_2SiF_6$ remained in the residue. The residue contains silicon dioxide ($SiO_2$), calcium fluoride, $K_2SO_4$, KF, unreacted $K_2SiF_6$ and contaminates and impurities from the cement dust.

The repulping of the strong filtrate residue was initiated with Run 7 and more water was required for the repulping than for the washing operation. More $K_2O$, F, and $SO_4$ were recovered in the repulp filtrate than had been previously recovered in the wash.

The goal for Runs 8, 9 and 10 was to extract the water soluble $K_2O$ from the cement dust and to use this dried residue containing CaO to hydrolyze the $K_2SiF_6$. The $K_2O$ conversion based on the HOH insoluble was 98%, which means the residue contained very little insoluble $K_2O$. No data are available for the strong and repulp filtrates for 9 and 10, nor are any soluble $SiO_2$ data available.

Run No. 11 was conducted by oxidizing the $K_2SiF_6$ by sparging air through the slurry during the hydrolysis and the data should be compared with Run 7. Based on the efficiency of $K_2O$ recovery, there was no significant difference.

In Runs 12 and 13, $Na_2SiF_6$ was substituted for potassium fluosilicate, but B2 cement dust was used. If Runs 12 and 13 are compared to Runs 7 through 11, the $Na_2SiF_6$ was more difficult to hydrolyze.

A summary of these runs is set forth in Table V.

TABLE V
$K_2SiF_6$ HYDROLYSIS USING CEMENT DUST

| Runs | Time | Temp. | % $K_2O$ in Filtrates | % $K_2O$ Conv. (Based on Total $K_2O$ in Residue) | % Efficiency of $K_2O$ Hydrolysis | % Max. $K_2O$ Conv. Based on HOH Insol $K_2O$ |
|---|---|---|---|---|---|---|
| 1 | 0.5 | | 74 | 66 | 70 | 93 |
| 2 | 0.5 | | 76 | 65 | 71 | 96 |
| 3 | 1.0 | | 85 | 83 | 84 | 94 |
| 4 | 1.0 | | 94 | 87 | 90 | 97 |
| 5 | 1.0 | | 73 | 79 | 76 | NA |

The invention has been described herein with reference to certain preferred embodiments; however, as obvious variations thereon will become apparent to those skilled in the art, the invention is not to be considered limited thereto.

What is claimed is:

1. A process for the production of monocalcium phosphate and phosphoric acid, and calcium fluoride, which comprises:
    (a) acidulating phosphate rock with an excess of phosphoric acid in the presence of silicon dioxide to produce an acidulation reaction product mixture containing monocalcium phosphate, phosphoric acid, and insoluble solids;

(b) separating insoluble solids from the mixture to recover a clarified solution of monocalcium phosphate in phosphoric acid;

(c) cooling the clarified solution to precipitate at least a portion of the monocalcium phosphate;

(d) recovering a portion of the monocalcium phosphate solid and passing the resulting solution to a defluorination stage wherein sufficient alkali metal ion is added to cause formation of alkali metal fluosilicate with the fluoride and silicon dioxide values contained in the clarified solution with resultant precipitation of said alkali metal fluosilicate;

(e) removing the solid alkali metal fluosilicate and monocalcium phosphate and hydrolyzing the alkali metal fluosilicate in an aqueous medium in the presence of the calcium ion provided by the monocalcium phosphate to convert the alkali metal fluosilicate and form calcium fluoride and silicon dioxide;

(f) removing the solid calcium fluoride and silicon dioxide from the mixture;

(g) recycling the alkali metal ion and excess monocalcium phosphate hydrolysis solution to the defluorination stage; and (h) removing the phosphoric acid and monocalcium phosphate process liquids from the defluorination reactor.

2. A process according to claim 1 wherein the alkali metal ion is a salt of potassium.

3. A process according to claim 1 wherein in step (c), the solution is cooled to a temperature difference of about 20°–50° below the reaction temperature to effect crystallization of at least a portion of the monocalcium phosphate contained in solution, and separating and recovering at least a portion of the solid monocalcium phosphate.

4. A process according to claim 1 wherein silicon dioxide is added to the defluorination stage (c) to provide sufficient silica for fluoride conversion.

5. A process according to claim 1 wherein the solids separated from the initial acidulation mixture are separated at substantially the same temperature as the acidulation reaction, said solids comprising sludge and sand from the reaction mixture.

6. A process according to claim 1 wherein the acidulation reaction is carried out by contacting the phosphate rock and phosphoric acid in a countercurrent manner.

7. A process according to claim 1 wherein the acidulation of the phosphate rock is carried out at a temperature in the range of about 60° to 100° C.

8. A process according to claim 1 wherein the alkali metal fluosilicate is subjected to hydrolysis by heating at a temperature in the range of about 100° C. up to the reflux temperature of the system to convert the alkali metal fluosilicate to calcium fluoride and silicon dioxide in the presence of a source of calcium, the solids are removed and the resulting alkali metal dihydrogen phosphate/phosphoric acid solution is recycled to the defluorination stage.

9. A process according to claim 1 wherein the phosphoric acid process liquids are reacted with sulfuric acid to form calcium sulfate, the calcium sulfate is recovered and at least a portion of the process liquids comprising phosphoric acid are recycled to the acidulation reactor, and the remainder of the phosphoric acid is recovered.

10. A process according to claim 3 wherein the solid monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid to produce a quality grade phosphoric acid and gypsum.

* * * * *